United States Patent
Zhao et al.

(10) Patent No.: US 7,561,871 B2
(45) Date of Patent: Jul. 14, 2009

(54) METHODS, SYSTEMS AND COMPUTER PROGRAM PRODUCTS FOR DIRECTING A USER TO A WIRELESS NETWORK ACCESS POINT

(75) Inventors: Wei Zhao, Alpharetta, GA (US); Xiaofeng Gao, Alpharetta, GA (US)

(73) Assignee: AT&T Intellectual Property I, L.P., Wilmington, DE (US)

( * ) Notice: Subject to any disclaimer, the term of this patent is extended or adjusted under 35 U.S.C. 154(b) by 351 days.

(21) Appl. No.: 10/646,962

(22) Filed: Aug. 25, 2003

(65) Prior Publication Data

US 2005/0048986 A1 Mar. 3, 2005

(51) Int. Cl.
*H04M 3/42* (2006.01)
*H04W 24/00* (2006.01)

(52) U.S. Cl. .............. 455/414.2; 455/414.1; 455/456.2; 455/456.3; 455/456.6

(58) Field of Classification Search .............. 455/414.1, 455/414.2, 414.3, 456.1, 456.2, 456.3, 456.6, 455/567, 457
See application file for complete search history.

(56) References Cited

U.S. PATENT DOCUMENTS

| | | | |
|---|---|---|---|
| 6,532,418 B2 * | 3/2003 | Chun et al. | 701/209 |
| 6,615,130 B2 * | 9/2003 | Myr | 701/117 |
| 6,650,902 B1 * | 11/2003 | Richton | 455/456.3 |
| 6,798,358 B2 * | 9/2004 | Joyce et al. | 340/995.24 |
| 2002/0022491 A1 * | 2/2002 | McCann et al. | 455/456 |
| 2002/0059453 A1 * | 5/2002 | Eriksson et al. | 709/238 |
| 2004/0165563 A1 * | 8/2004 | Hsu et al. | 370/338 |
| 2004/0203873 A1 * | 10/2004 | H. Gray | 455/456.1 |
| 2004/0203890 A1 * | 10/2004 | Karaoguz et al. | 455/456.1 |
| 2004/0204071 A1 * | 10/2004 | Bahl et al. | 455/557 |
| 2005/0136949 A1 * | 6/2005 | Barnes | 455/461 |
| 2006/0148486 A1 * | 7/2006 | Kim et al. | 455/456.1 |

* cited by examiner

*Primary Examiner*—George Eng
*Assistant Examiner*—Un C Cho
(74) *Attorney, Agent, or Firm*—Myers Bigel Sibley & Sajovec

(57) ABSTRACT

A mobile user request for a location of a wireless network access point can be received via a user terminal. A geographic location of the mobile user can be identified responsive to the user request. A wireless network access point convenient to the user location can be identified.

20 Claims, 6 Drawing Sheets

METHODS, SYSTEMS AND COMPUTER PROGRAM PRODUCTS FOR DIRECTING A USER TO A WIRELESS NETWORK ACCESS POINT

FIELD OF THE INVENTION

The present invention relates to wireless networks, and more specifically, to locating wireless networks.

BACKGROUND OF THE INVENTION

Wireless local area networks (WLANs), such as Wireless Fidelity (Wi-Fi) networks (based on the IEEE 802.11b standard), are available for a wide range of user devices in both business and home environments. Personal computers, personal laptop computers, pervasive computing devices such as a personal data assistants (PDAs), smartphones, or other mobile or stationary user terminals can have a built-in or installed wireless feature.

Wireless local area networks can be deployed in private spaces, such as in an office or home setting, to provide wireless service to a specific group of users. However, wireless local area networks can also be deployed in public spaces where a variety of users are allowed to access the network. Wireless local area networks are increasingly being deployed in public places, such as hotels, airports, restaurants, and other places where customers or travelers may find WLAN access desirable. Traveling professionals may find it convenient to stay at a hotel that offers WLAN access so that the hotel guests can access the Internet using a WLAN enabled device.

Users typically need to contact the establishments in which they are traveling or check descriptions of amenities provided by the establishments in order to find a WLAN. This can be a time consuming process and frustrating for the user. Moreover, some business establishments would like to attract additional customers by offering WLAN services; however, it may be difficult for businesses to advertise WLAN services effectively.

SUMMARY OF THE INVENTION

According to embodiments of the present invention, methods, systems, and computer program products are provided that can direct a mobile user to a wireless network access point. A mobile user request for a location of a wireless network access point can be received via a user terminal. A geographic location of the mobile user can be identified responsive to the user request. A wireless network access point convenient to the user location can be identified.

In some embodiments, the identified wireless network access point can be communicated to the user. Identifying the geographic location of the mobile user can include locating a wireless communications signal from the user terminal. The wireless network access point can be identified by comparing the geographic location of a user to known locations of a plurality of access points. The wireless network access point can be identified by calculating a travel time between the user location and each of the plurality of wireless network access points, and by selecting one of the plurality of wireless network access points having the shortest travel time. The travel time can be calculated based on distance and road conditions. The road conditions can include real-time traffic conditions.

In further embodiments, the user request can include wireless network amenities. A wireless network access point that includes the requested amenities in the vicinity of the user location can be identified. The amenities can include a type of facility and/or service available in the vicinity of the wireless network, including a service provider associated with the wireless network access point. In some embodiments, information concerning amenities can be communicated to the user.

In some embodiments, directions from the user location to the selected wireless network access point can be communicated to the user.

The wireless network can be a broadband wireless network, such as a Wireless Fidelity ("Wi-Fi") network. The user terminal can be a mobile communications device and/or a computer processor terminal.

As will further be appreciated by those of skill in the art, while described above primarily with reference to method aspects, the present invention may be embodied as methods, apparatus/systems and/or computer program products.

DETAILED DESCRIPTION

Figure 1:
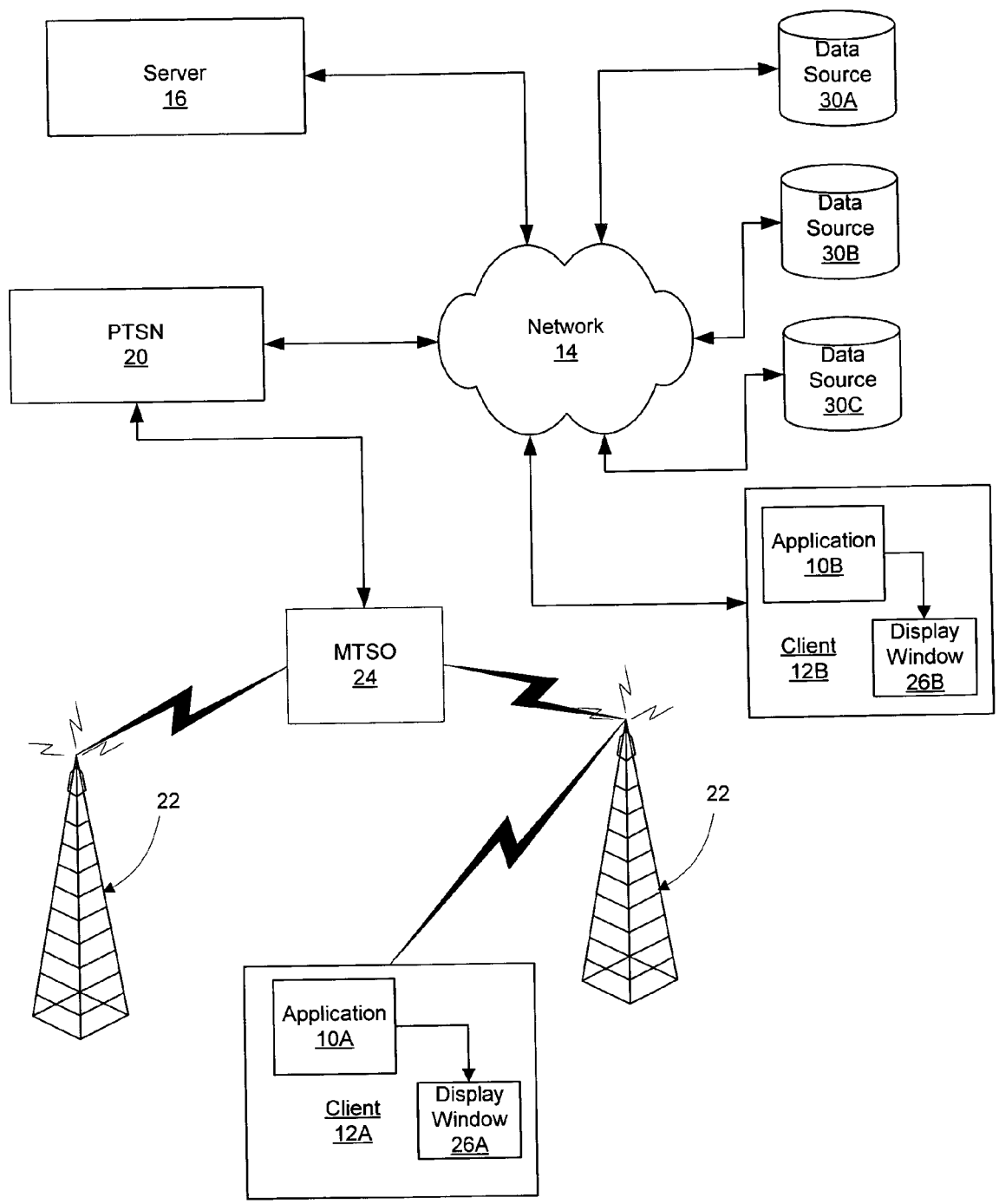
FIG. 1 is a block diagram of a system according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by those of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, embodiments according to the present invention provide direction to a user at a user terminal to a wireless network access point. A user request for a location of a wireless network access point can be received by a data processor. The data processor can identify a geographic location of the mobile user responsive to receiving the user request. The data processor can identify a wireless network access point convenient to the user location. The identified wireless network access point can be the location having the shortest distance and/or the shortest travel time to the user. The identified wireless network access point can be communicated to the user.

Various embodiments of the present invention will now be described with reference to FIGS. 1 through 6. FIG. 1 illustrates a network environment in which embodiments of the present invention may be utilized. As will be appreciated by those of skill in the art, however, the operations of embodiments of the present invention may be carried out on a single processing system with or without access to a network such as an intranet or the Internet. As seen in FIG. 1, mobile terminal client(s) 12A and personal computing device client(s) 12B can communicate over a network 14. A mobile terminal client 12A can be a radiotelephone or other handheld device, such as a personal data assistant (PDA), smartphone, or other mobile user terminal. The mobile terminal client 12A can communicate through one or more mobile telecommunications switching offices (MTSOs) 24 via base stations 22. The MTSO 24 may provide communications with a public telecommunications switching network (PTSN) 20, which can, in turn, can provide communications with the network 14. A personal computing device client 12B can be a personal computer, laptop computer or other wired communications device. The personal computing device client 12B can access the network 14 as shown in FIG. 1, for example, through a modem, such as a dial-up telephone modem, a digital service line (DSL) modem, or a cable modem. Moreover, a wireless communications device can be used for personal computing device client 12B to connect to the network 14 using various techniques, including those known to those of skill in the art, such as using a Wireless Fidelity (Wi-Fi) connection.

It should be understood that the various clients 12A, 12B can communicate with the network 14 directly or indirectly, such as via other networks, including wireless networks. Moreover, devices can be provided that combine certain functionalities of the various clients 12A, 12B. For example, a single device may be configured to connect to the network 14 through either the base station 22, the MTSO 24, the PTSN 20, a modem, a wireless network or a combination thereof.

The clients 12A, 12B may utilize applications 10A, 10B, respectively, such as a web browser or other application or program to communicate over the network 14 to another data processing system which may act as a server 16. The applications 10A, 10B can communicate with a display window 26A, 26B to display information. The network 14 may be an intranet or the Internet or other networks known to those of skill in the art.

As is further illustrated in FIG. 1, the server 16 can be in communication with data sources 30A, 30B, and 30C and the PTSN 20. The data sources 30A, 30B, and 30C can be computer servers, processing systems, or other networks that can send data to the clients 12A, 12B over the network 14. The application 10 can display the data in the display window 26, which can be viewed and manipulated by the user.

Figure 2:
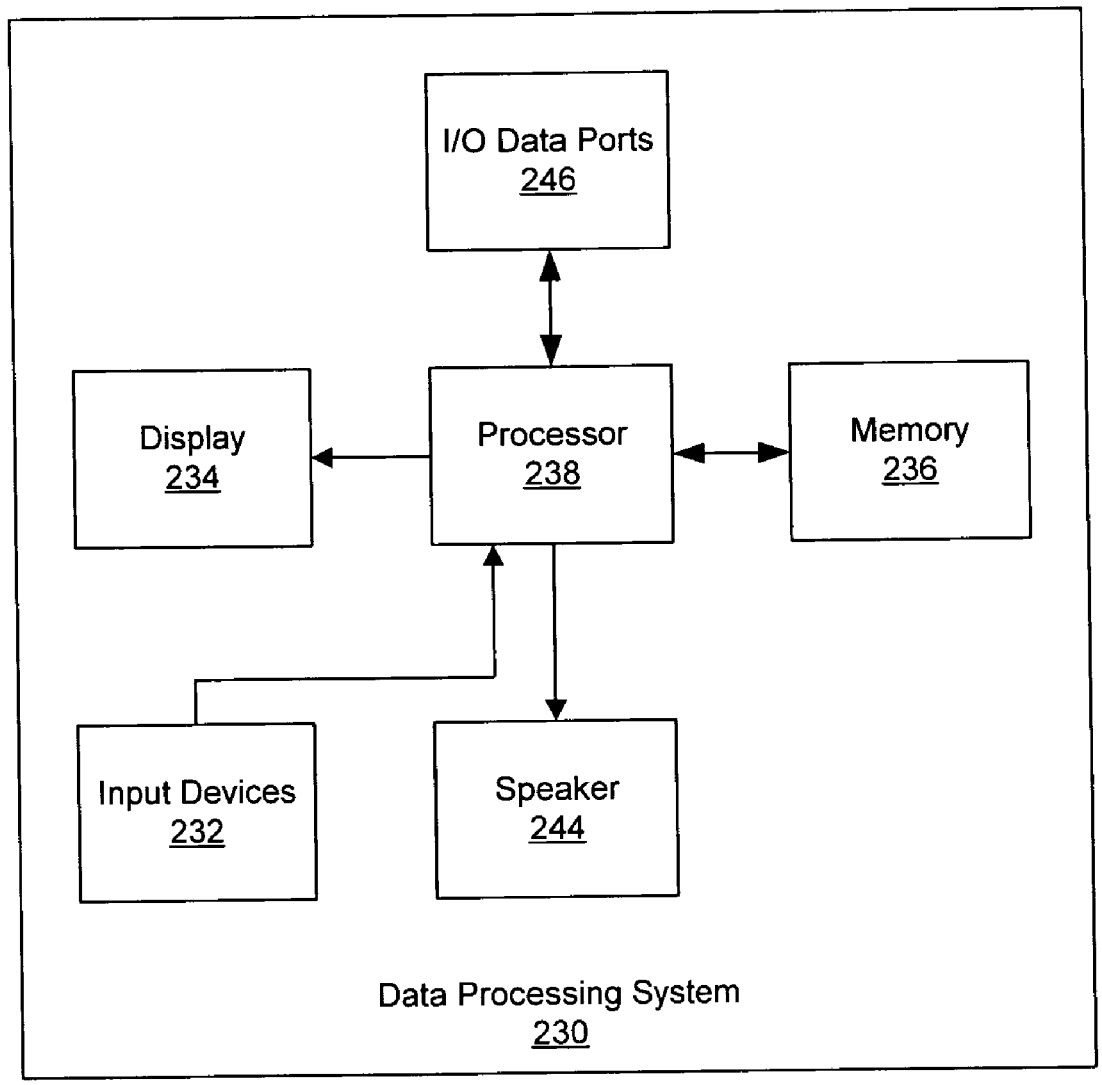
FIG. 2 is a block diagram of a data processing system according to embodiments of the present invention.

Referring to FIG. 2, exemplary embodiments of a data processing system 230 in accordance with embodiments of the present invention typically include input device(s) 232 such as a keyboard or keypad, touch sensitive screen, light sensitive screen, or mouse, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional data processing systems, which may be configured to operate as described herein. Furthermore, as will be appreciated by those of skill in the art, the data processing system 230 may be configured as the client(s) 12A, 12B or the server 16.

Figure 3:
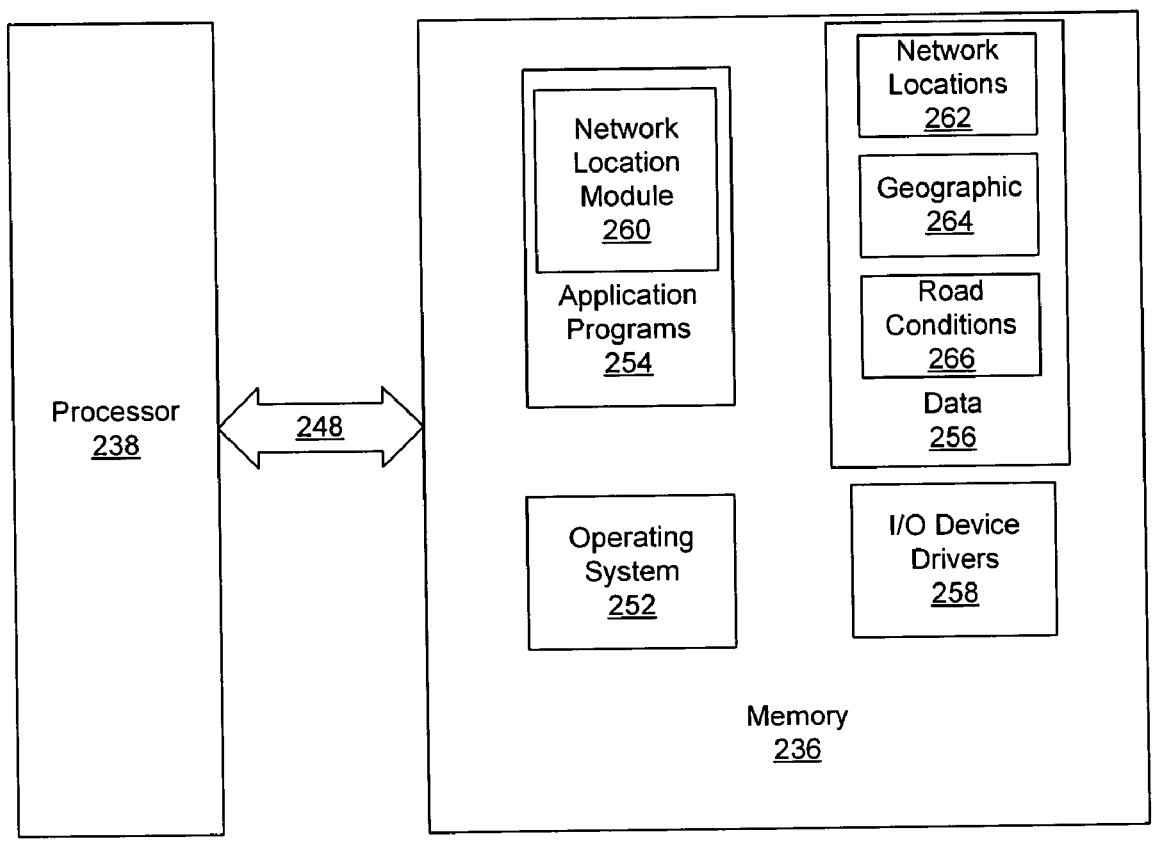
FIG. 3 is a more detailed block diagram of data processing systems according to embodiments of the present invention.

FIG. 3 is a block diagram of embodiments of data processing systems that illustrates systems, methods, and computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: an operating system 252; application programs 254; input/output (I/O) device drivers 258; and data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000, or WindowsXP from Microsoft Corporation, Redmond, Wash., Unix or Linux. The I/O device drivers 258 typically include software routines accessed through the operating system 252 by the application program 254 to communicate with devices such as the input devices 232, the display 234, the speaker 244, the I/O data port(s) 246, and certain components of the memory 236. The application programs 254 are illustrative of the programs that implement the various features of the data processing system 230 and can include at least one application which provides operations of embodiments of the present invention. The data 256 represents the static and dynamic data used by the application programs 254, the operating system 252, the I/O device drivers 258, and other software programs that may reside in the memory 236.

As is further seen in FIG. 3, the application programs 254 can include a network location module 260. The network location module 260 may carry out operations as described herein for directing a user at a user terminal to a wireless network access point. For example, the network location module 260 can receive a request for a location of a wireless network access point. The network location module 260 can identify a geographic location of the mobile user responsive to receiving the user request. The network location module 260 can then identify a wireless access point convenient to the user location.

Moreover, the data 256, which can be utilized by the network location module 260, may include network data 262, geographic data 264 and road condition data 266. The network data 262 can include information about various wireless networks, including the physical location or address of a particular wireless network and the amenities available at or near the wireless network. As used herein, an "amenity" can include a service or characteristic of the location and/or network, such as whether the wireless network is at or near a hotel, a restaurant, stores, a park, an airport, etc. The characteristics of the network can include the communications company providing the wireless network (i.e., the network service provider), the speed of connection provided, etc. For example, a wireless network can be identified in the network data 262 as a hotel with a restaurant at a particular street address and having a particular wireless service provider. The geographic data 264 can include geographic maps, including road maps and public transportation maps that can be used by the network location module 260 to direct a user from the user's location to a desired wireless network. The road condition data 266 can include information about road conditions, such as construction zones, speed limits, traffic lights, traffic accidents, etc. The road condition data 266 can include real-time information about current road conditions.

Accordingly, the network location module 260 can identify available wireless networks and their locations in the network data 262 and provide directions based on the geographic data 264. The network location module 260 can further calculate travel times between a particular user location and more than one wireless network location using the geographic data 264 and/or the road condition data 266 to estimate travel time.

While the present invention is illustrated, for example, with reference to a network location module 260, network data 262, geographic data 264, and road condition data 266, as will be appreciated by those of skill in the art, the network location module 260, network data 262, geographic data 264, and road condition data 266 may also be incorporated into other components, such as the operating system 252. Thus, the present invention should not be construed as limited to the configuration of FIG. 3 but is intended to encompass any configuration capable of carrying out the operations described herein.

Figure 4:
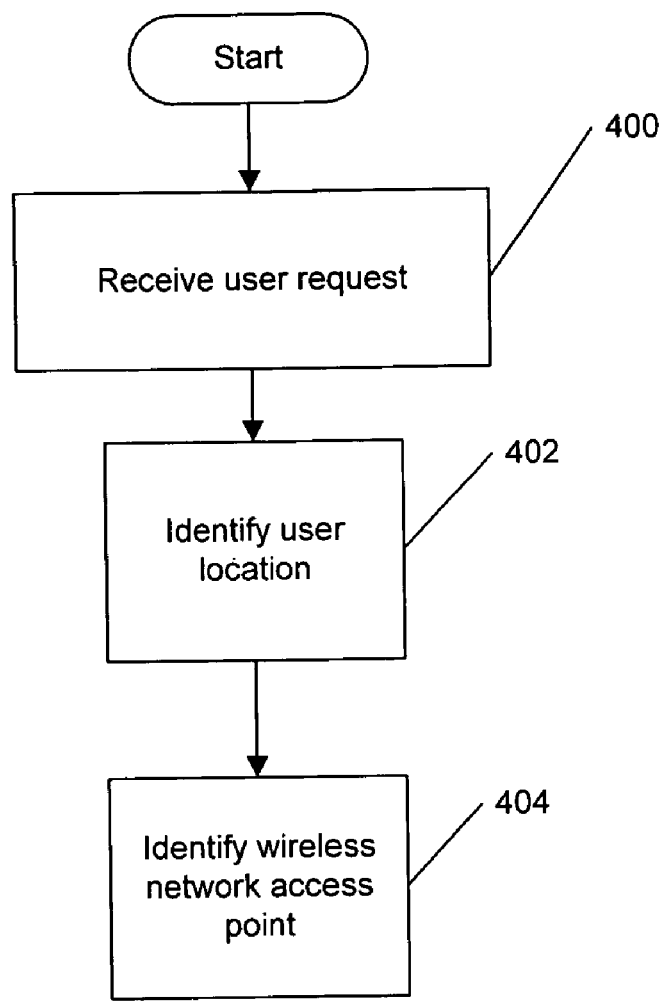
FIG. 4 is a flowchart illustrating operations according to embodiments of the present invention.

Embodiments of the present invention will now be described in more detail with reference to FIG. 4, which is a flowchart illustration of operations. The operations can be carried out by the network location module 260. As seen in FIG. 4, the network location module 260 may receive a mobile user request for a location of a wireless network access point (Block 400). The network location module 260 can identify the geographic location of the mobile user responsive to receiving the user request (Block 402). The geographic location of the mobile user can be identified by locating a wireless communications signal from the user terminal. In some embodiments, the user location can be included as part of the user request. The network location module 260 can then identify a wireless network access point convenient to the user location (Block 404).

As shown, for example, in FIG. 1, the user can enter the request and/or location (Block 400) from a mobile terminal client 12A or a personal computing device client 12B. In some embodiments, the user can enter the request and/or location to a stand-alone computer, which can provide operations according to embodiments of the present invention. For example, the network location module 260, network data 262, geographic data 264, and/or road condition data 266 can be provided on a stand-alone computer processor. In some embodiments, operations according to embodiments of the present invention can be incorporated into an automobile navigation and/or information system. The user location can be submitted by the user, or, alternatively, the user location can be automatically determined by a global positioning device or by locating the position of a mobile terminal client 12A based on a received signal.

Figure 5:
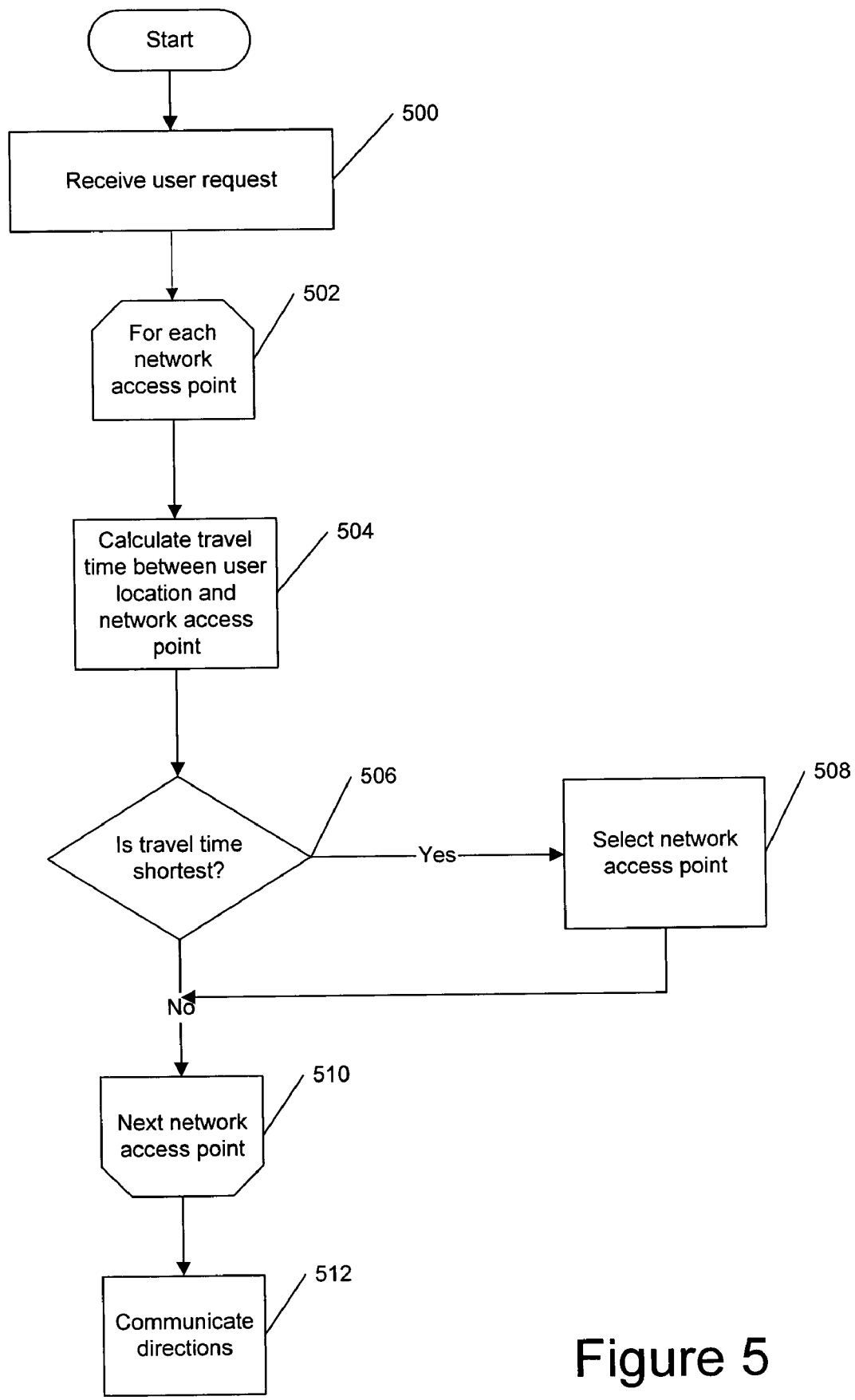
FIG. 5 is a flowchart illustrating operations according to further embodiments of the present invention.

With reference FIG. 5, the network location module 260 can receive a user request for a wireless network access point (Block 500). For each network access point, such as in a list of known locations of a plurality of access points, (Block 502), the network location module 260 can calculate a travel time between the user location and the network access point (Block 504). The travel time calculation can include calculations based on distance, road conditions, traffic conditions, and/or speed limits, for example, from the geographic data 264 and/or road conditions data 266 as shown in FIG. 3. Moreover, travel time calculations can include calculating the travel time for alternative routes and selecting the shortest travel time. For example, if a user could travel either ten miles on the highway at sixty-five miles per hour or nine miles on a side-street at thirty miles per hour to the network access point location, then the travel times would be approximately nine minutes and eighteen minutes, respectively. In this particular instance, the network location module 260 would select the highway route as the quickest route. However, if the road conditions data 266 indicate that there is an accident on a highway with traffic moving at an average of twenty miles per hour (that is, thirty minutes travel time), then the side-street route would be selected as the quickest route. In some embodiments, if the road conditions data 266 indicates that there is an accident on a particular route, the network location module 260 can suggest alternative routes.

Referring to FIG. 5, if the calculated travel time is the shortest time when compared with any previously calculated travel times to other network access points (Block 506), then the network access point is selected (Block 508). If the travel time is not the shortest (Block 506), then the network location module 260 proceeds to calculate the travel time for the next network access point (Block 510). After the travel times for the network access point have been compared, the network location module 260 can communicate directions to the user (Block 512). The directions can include an address, road map directions, and/or public transportation directions.

Figure 6:
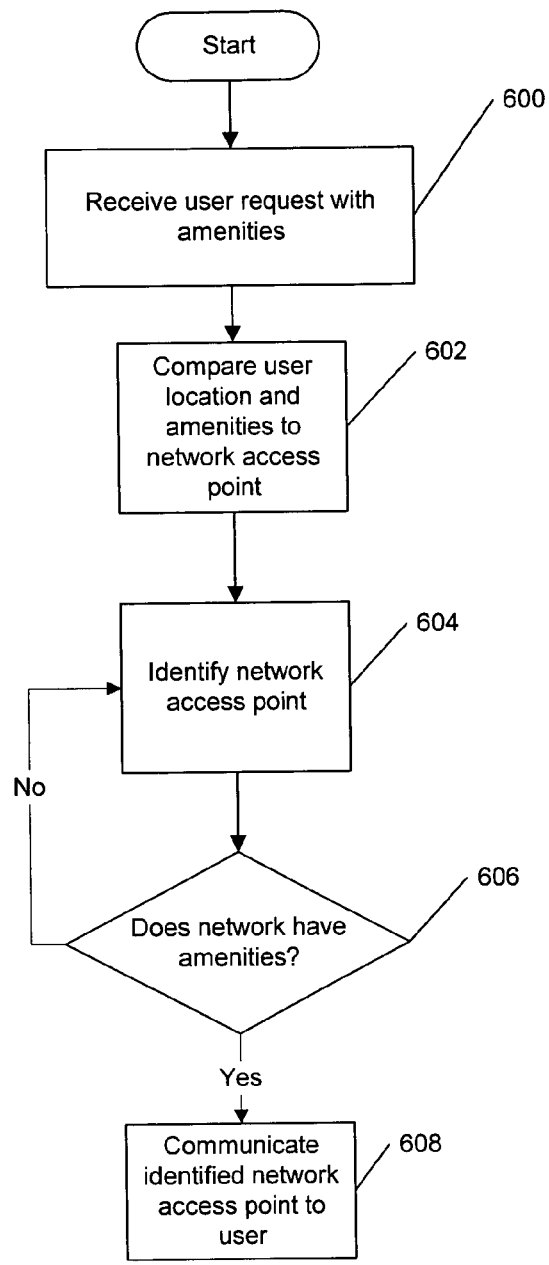
FIG. 6 is a flowchart illustrating operations according to still further embodiments of the present invention.

As shown in FIG. 6, a user request for a network access point can further include particular amenities that are desirable to the user (Block 600). The network location module 260 can compare a user location to known locations of a plurality of access points (Block 602) and identify a network access point convenient to the user (Block 604). If the identified network access point does not have the desired amenities (Block 606), then the network location module 260 continues to identify network access points (Block 604). If the identified network access point does have the desired amenities (Block 606), the network location module 260 can communicate one or more identified network access point to the user (Block 608).

The user location for which a network access point is requested (at Block 600) can be the current location of the user or, alternatively, the user can enter a future location. For example, if the user is planning a trip to a particular city, the user can request a location of a wireless network access point in the city that is located at a hotel with a four-star restaurant. The network location module 260 can identify network access points in the vicinity of the user that have hotel and four-star restaurant services. In some embodiments, the network location module 260 can provide a list of wireless network access points that can be ranked based on various criteria such as the distance from the user location and which amenities are available. For example, if the network location request includes a request for a hotel with a four-star restaurant, then the network location module 260 can rank the network access points that include a hotel and a four-star restaurant highest followed by network access points that include a hotel and a three-star restaurant or a two-star restaurant. Network access points without the desired amenities can be ranked last. In some embodiments, the network location module can provide information about the amenities of identified network access points with or without a user request for certain amenities.

While the present invention has been described with reference to a client-server architecture, as will be appreciated by those of skill in the art, the present invention may be provided as a stand-alone application.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for directing a mobile user to a wireless network access point comprising:
   receiving a mobile user request for a location of a wireless network access point via a user terminal, wherein the user request comprises one or more amenities including one or more of a hotel, a restaurant, a store, a park and an airport;
   identifying a geographic location of the mobile user responsive to receiving the user request;
   identifying a plurality of wireless network access points convenient to the user that provides access to the one or more amenities based on stored data including the physical location or address of a wireless network and the amenities available at or near the wireless network; and
   ranking a plurality of wireless network access points based on a distance from a user location and the one or more amenities requested by the user such that wireless network access points that include the one or more amenities are ranked highest and network access points without the one or more amenities are ranked last;
   wherein the user request includes a particular service provider associated with the wireless network and identifying a wireless network access point further comprises identifying a wireless network access point provided by the particular service provider.

2. The method of claim 1, further comprising communicating the plurality of identified wireless network access points to the user.

3. The method of claim 1, wherein identifying a geographic location of the mobile user comprises locating a wireless communications signal from the user terminal.

4. The method of claim 1, wherein identifying a plurality of wireless network access point comprises comparing the geographic location of the user to known locations of a plurality of access points.

5. The method of claim 4, wherein identifying a plurality of wireless network access points comprises:
   calculating a travel time between the user location and each of the plurality of wireless network access points; and
   selecting one of the plurality of wireless network access points having the shortest travel time.

6. The method of claim 5, wherein calculating a travel time is based on distance and road conditions.

7. The method of claim 6, wherein road conditions comprise realtime traffic conditions.

8. The method of claim 1, wherein the amenities include a type of facility and/or service available in the vicinity of the wireless network access point.

9. The method of claim 1, further comprising communicating directions from the user location to the selected wireless network access point.

10. The method of claim 1, further comprising communicating information concerning amenities to the user terminal.

11. The method of claim 1, wherein the wireless network is a broadband wireless network.

12. The method of claim 11, wherein the broadband wireless network is a Wireless Fidelity ("Wi-Fi") network.

13. The method of claim 1, wherein the user terminal is a mobile communications device.

14. The method of claim 1, wherein the user terminal is a computer processor terminal.

15. A system for directing a mobile user to a wireless network access point comprising:
   means for receiving a mobile user request for a location of a wireless network access point via a user terminal, the user request further comprising one or more amenities including one or more of a hotel, a restaurant, a store, a park and an airport;
   means for identifying a geographic location of the mobile user responsive to receiving the user request; and
   means for identifying a plurality of wireless network access point points convenient to the user that provides access to the requested amenities based on stored data including the physical location or address of a wireless network and the amenities available at or near the wireless network,
   means for ranking the plurality of wireless network access points based on a distance from a user location and the one or more amenities requested by the user such that wireless network access points that include the one or more amenities are ranked highest and network access points without the one or more amenities are ranked last;
   wherein the user request includes a particular service provider associated with the wireless network and the means for identifying a wireless network access point further comprises means for identifying a wireless network access point provided by the particular service provider.

16. The system of claim 15, wherein the means for identifying a wireless network access point comprises comparing the geographic location of the user to known locations of a plurality of access points.

17. The system of claim 16, wherein the means for identifying a plurality of wireless network access points comprises:
   means for calculating a travel time between the user location and each of the plurality of wireless network access points; and
   means for selecting one of the plurality of wireless network access points having the shortest travel time.

18. A computer program product for directing a mobile user to a wireless network access point, the computer program product being encoded on a computer readable medium having computer readable program code embodied therein, the computer program product comprising:
   computer readable program code that receives a mobile user request for a location of a wireless network access point via a user terminal, the user request further comprising one or more amenities including one or more of a hotel, a restaurant, a store, a park and an airport;
   computer readable program code that identifies a geographic location of the mobile user responsive to receiving the user request;
   computer readable program code that identifies a plurality of wireless network access points convenient to the user that provides access to the requested amenities based on stored data including the physical location or address of a wireless network and the amenities available at or near the wireless network; and
   computer readable program code that ranks the plurality of wireless network access points based on a distance from a user location and the one or more amenities requested by the user such that wireless network access points that include the one or more amenities are ranked highest and network access points without the one or more amenities are ranked last;
   wherein the user request includes a particular service provider associated with the wireless network and the computer readable program code that identifies a wireless network access point further comprises computer readable program code that identifies a wireless network access point provided by the particular service provider.

19. The computer program product of claim 18, wherein the computer readable program code that identifies a plurality of wireless network access points comprises computer readable program code that compares the geographic location of the user to known locations of a plurality of access points.

20. The computer program product of claim 19, wherein the computer readable program code that identifies a plurality of wireless network access point comprises:
   computer readable program code that calculates a travel time between the user location and each of the plurality of wireless network access points; and
   computer readable program code that selects one of the plurality of wireless network access points having the shortest travel time.

* * * * *

UNITED STATES PATENT AND TRADEMARK OFFICE
CERTIFICATE OF CORRECTION

PATENT NO. : 7,561,871 B2  Page 1 of 1
APPLICATION NO. : 10/646962
DATED : July 14, 2009
INVENTOR(S) : Zhao et al.

It is certified that error appears in the above-identified patent and that said Letters Patent is hereby corrected as shown below:

Column 8, Claim 15, Line 55:
Please correct "access point points" to read -- access points --

Signed and Sealed this

Third Day of November, 2009

David J. Kappos
*Director of the United States Patent and Trademark Office*